US012783465B2

(12) United States Patent
Schay

(10) Patent No.: US 12,783,465 B2
(45) Date of Patent: Nov. 3, 2026

(54) SYNTHETIC FILE SYSTEM TREE GENERATION AND ASSOCIATED METHODS THEREOF

(71) Applicant: NETAPP, INC., San Jose, CA (US)

(72) Inventor: Peter Geza Schay, San Francisco, CA (US)

(73) Assignee: NetApp, Inc., San Jose, CA (US)

( * ) Notice: Subject to any disclaimer, the term of this patent is extended or adjusted under 35 U.S.C. 154(b) by 120 days.

(21) Appl. No.: 17/953,594

(22) Filed: Sep. 27, 2022

(65) Prior Publication Data

US 2024/0104056 A1 Mar. 28, 2024

(51) Int. Cl.
*G06F 16/16* (2019.01)
*G06F 16/13* (2019.01)

(52) U.S. Cl.
CPC ............ *G06F 16/164* (2019.01); *G06F 16/13* (2019.01)

(58) Field of Classification Search
CPC ............................... G06F 16/164; G06F 16/13
USPC ........................................................ 707/822
See application file for complete search history.

(56) References Cited

U.S. PATENT DOCUMENTS

| | | | | |
|---|---|---|---|---|
| 7,584,239 | B1 * | 9/2009 | Yan | H04L 69/18 709/212 |
| 8,560,579 | B1 * | 10/2013 | Gross | H04L 43/50 707/823 |
| 9,244,976 | B1 * | 1/2016 | Zhang | G06F 16/2453 |
| 9,424,273 | B2 | 8/2016 | Schay | |
| 9,569,443 | B1 * | 2/2017 | van Rietschote | G06F 16/116 |
| 10,223,377 | B1 * | 3/2019 | Moghe | G06F 16/185 |
| 11,048,699 | B1 * | 6/2021 | Grider | G06F 16/2272 |
| 11,615,005 | B2 | 3/2023 | Ito et al. | |
| 2004/0044724 | A1 * | 3/2004 | Bell | G06F 8/65 709/203 |
| 2010/0095164 | A1 * | 4/2010 | Kamei | G06F 3/065 714/48 |
| 2012/0166478 | A1 * | 6/2012 | Das | G06F 16/2453 707/769 |
| 2012/0268483 | A1 | 10/2012 | Soupikov et al. | |

(Continued)

OTHER PUBLICATIONS

Anonymous; "Manifest file—Wikipedia"; Jun. 14, 2020; pp. 1-3; XP055850037; Retrieved from the Internet: https://en.wikipedia.org/w/index.php?title=Manifest_file&oldid=962547770; Retrieved on Oct. 11, 2021.

(Continued)

*Primary Examiner* — Amy Ng
*Assistant Examiner* — Abdullah A Daud
(74) *Attorney, Agent, or Firm* — Jaffery Watson Hamilton & DeSanctis LLP

(57) ABSTRACT

Methods and systems for a networked storage environment are provided. One method includes generating a plurality of metrics associated with a file system from a scan of the file system; defining a synthetic file tree based on a tree descriptor, a seed value and a total number of entries for the synthetic tree, the tree descriptor based on one or more of the plurality of metrics; utilizing, by a first worker process, a first portion of the tree descriptor and the seed value to generate a first subset of the synthetic file tree; and utilizing, by a second worker process, a second portion of the tree descriptor and the seed value to generate a second subset of the synthetic file tree.

20 Claims, 8 Drawing Sheets

(56) References Cited

U.S. PATENT DOCUMENTS

| | | | | |
|---|---|---|---|---|
| 2014/0365440 | A1* | 12/2014 | Steiner | G06F 16/128 707/639 |
| 2015/0309882 | A1 | 10/2015 | Harrison et al. | |
| 2016/0357618 | A1* | 12/2016 | Degioanni | G06F 11/3082 |
| 2017/0364357 | A1* | 12/2017 | Webber | G06F 12/00 |
| 2018/0075643 | A1* | 3/2018 | Sequeira | G01C 21/206 |
| 2019/0251468 | A1* | 8/2019 | Guillame-bert | G06N 7/01 |
| 2020/0050607 | A1* | 2/2020 | Pal | G06F 16/2471 |
| 2020/0242255 | A1* | 7/2020 | Sharma | G06F 21/565 |
| 2021/0117289 | A1 | 4/2021 | Lin et al. | |
| 2023/0305994 | A1 | 9/2023 | Schay | |
| 2023/0305999 | A1* | 9/2023 | Yeom | G06F 16/1734 |
| 2025/0165430 | A1 | 5/2025 | Schay | |

OTHER PUBLICATIONS

International Search Report, International Patent Application No. PCT/US2023/013619, Jun. 1, 2023, 5 pgs.
International Written Opinion, International Patent Application No. PCT/US2023/013619, Jun. 1, 2023, 7 pgs.
Notice of Allowance mailed on Sep. 25, 2024 for U.S. Appl. No. 17/706,145, filed Mar. 28, 2022, 10 pages.
Non-Final Office Action mailed on Mar. 25, 2025 for U.S. Appl. No. 17/706,145, filed Mar. 28, 2022, 10 pages.
Final Office Action mailed on Aug. 27, 2025 for U.S. Appl. No. 17/706,145, filed Mar. 28, 2022, 13 pages.
Non Final Office Action mailed on Dec. 16, 2025 for U.S. Appl. No. 19/034,213, filed Jan. 22, 2025, 9 pages.
Notice of Allowance mailed on Dec. 29, 2025 for U.S. Appl. No. 17/706,145, filed Mar. 28, 2022, 8 pages.

* cited by examiner

FIG. 1E
Count Used
All File Types 262M 109 TiB
Regular Files 161M 108 TiB
Directories 37.6M 406 GiB
Symlinks 120,714 882 MiB
Specials None 0
Avg Max
Name Length 23 162
File Size 587 KiB 241 GiB
Directory Entries 7 426,569
File Depth 11 23
Top 5 File Owners
14.5M
15.5M
15.5M
16.2M
33.4M
Top 5 Space Users
5.77 TiB
6.13 TiB
6.69 TiB
7.83 TiB
14.4 TiB
Number of Files
Space Used
N/A
Dedupe Estimate
26.4 GiB
Zero Blocks
6.22 TiB
Hard Links
48,709
Extensions
24
Groups
151
Users
Directory Entries
Extension Types
File Depth
Accessed
Modified
Changed

SYNTHETIC FILE SYSTEM TREE GENERATION AND ASSOCIATED METHODS THEREOF

Technical Field: The present disclosure relates to networked storage systems and more particularly, to generating a synthetic file system tree based on scanning a source file system in the networked storage system.

Background: Various forms of storage systems are used today. These forms include direct attached storage (DAS), network attached storage (NAS) systems, storage area networks (SANs), and others. Network storage systems are commonly used for a variety of purposes, such as providing multiple users with access to shared data, backing up data and others. A storage system typically includes at least one computing system executing a storage operating system for storing and retrieving data on behalf of one or more client computing systems ("clients"). The storage operating system uses a file system to stores and manages shared data containers in a set of mass storage devices operating in a group of a storage sub-system. The storage devices within a storage system are typically organized as one or more groups (or arrays), wherein each group is operated as a RAID (Redundant Array of Inexpensive Disks). Storage systems store data for large file systems with many files/entries, e.g., in some instances millions of files.

Storage system providers continue to develop applications and software products for managing and securing stored data. Often these products, product demonstrations or proof of concepts (POCs) are not based on real-world, file system data because customers cannot provide their data to storage system providers for security reasons, and it may also be difficult to move/copy a large amount of data. To develop products or POCs, storage system providers typically use data that is based on synthetic benchmarks vis-à-vis customer data. Using this "wrong" kind of data can be costly e.g., developing a software product which fails in the real world costing millions of dollars; selling storage solution configurations that do not meet customer expectations; or losing business opportunities because a customer may not be interested in product demonstrations that do not involve real world customer information. Continuous efforts are being made to develop computing technology for generating synthetic file system trees that are based on real file system metadata that can be used for developing new software products or for any other reason including better use of existing storage system resources.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

Figure 1A:
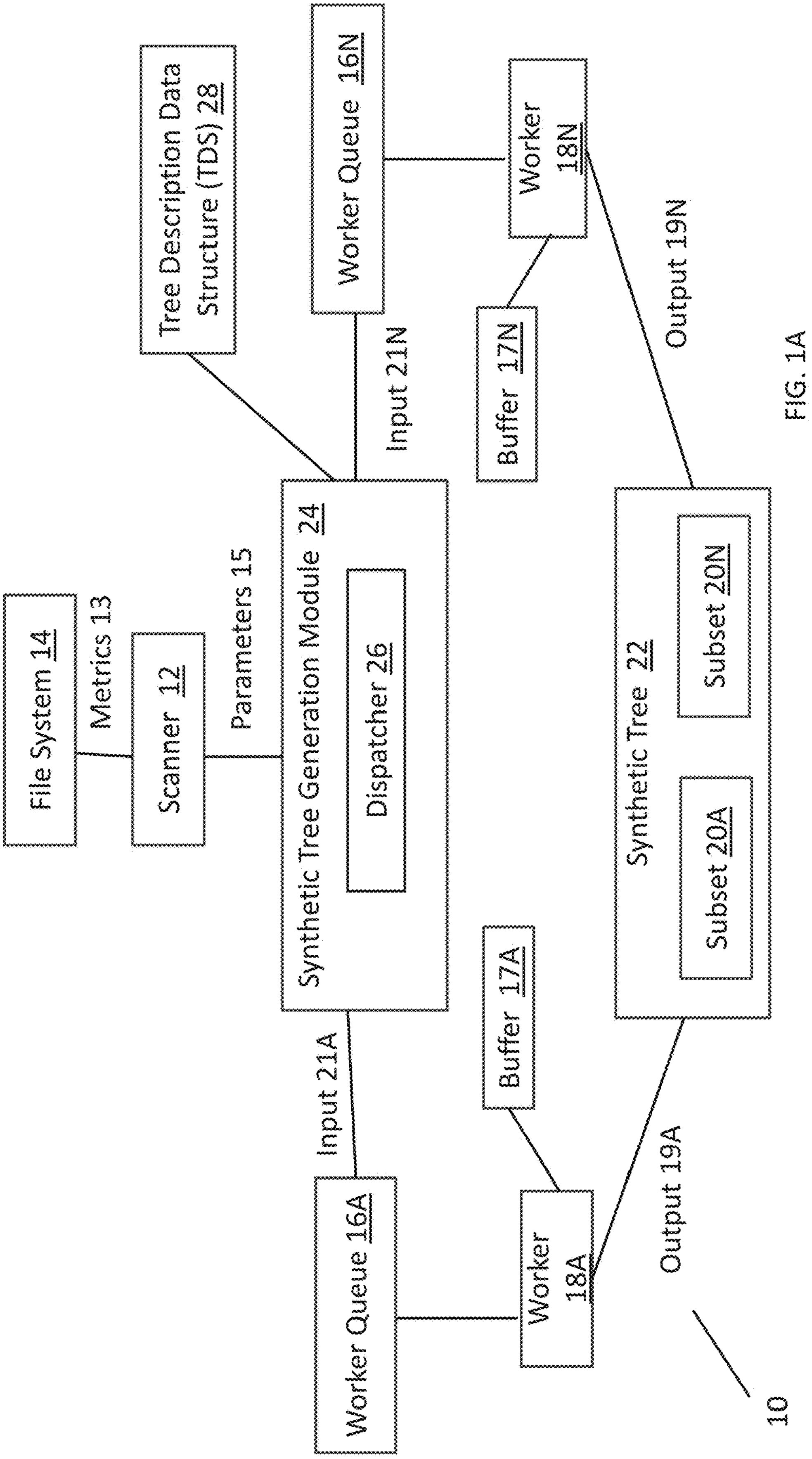
FIG. 1A shows a block diagram of a system for generating a synthetic file system tree, according to one aspect of the present disclosure.

As a preliminary note, the terms "component," "module," "system," and the like as used herein are intended to refer to a computer-related entity, either a general-purpose processor, hardware, software executed by the general-purpose processor, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer-executable components can be stored, for example, in non-transitory, computer-readable media including, but not limited to, an ASIC (application specific integrated circuit), solid state drive, CD (compact disc), DVD (digital video disk), ROM (read-only memory), floppy disk, hard disk, storage class memory, EEPROM (electrically erasable programmable read-only memory), memory stick or any other storage device type, in accordance with the claimed subject matter.

The present disclosure describes innovative computing technology to efficiently generate a synthetic (or a pseudo-random) file system tree (also referred to as a "synthetic tree") from a source file system. Typically, the source file system includes a plurality of entries, where each entry is a regular file, a directory, a symbolic link, a hard link, or a special file system-dependent type entry. The source file system also includes metadata attributes associated with each of the plurality of entries. The metadata may include a name of each file system entry, identifies an owner of each entry, permissions associated with each entry (e.g., read, write or both read and write access), last modification time when a file system entry was modified or any other attribute. The source file system may also include data stored by one or more applications as contents of the regular file entries. The term "file" as used throughout this specification includes data containers, storage objects, structured and unstructured data.

At a high level, the innovative technology described herein provides systems and methods to generate synthetic file trees which can be used to simulate data processing workloads (such as migration, content search, and deduplication etc.) especially for systems that use large file systems with millions or even billions of entries. In one aspect, metadata scanned from a file system is used to generate one or more synthetic trees which for all practical purposes perform similar to the source file system tree.

In one aspect, the following innovative processor-executable workflow is used to generate the synthetic file system trees based on real-world, metadata scanned from a source file system: (a) A processor-executable, scanner module scans a source file system tree to obtain file system attributes/metrics that describe the source file system. The attributes include maximum, minimum and average values of file name lengths and directory sizes, file sizes, file types, name length histograms, modification and access time histograms indicating when and how often files/directories are accessed, top storage system users by storage capacity, number of files, number of directories, and data attributes for files that have data including whether the files are compressible, data type and other metrics.

The scanned metrics are input to a processor-executable, synthetic tree generation module that defines a tree descriptor data structure ("TDS") (e.g., a JSON (JavaScript Object Notation) object. The TDS includes parameters matching the scanned metrics, a tree seed value that may be used to produce other seed values, a synthetic tree size defined by a total number of entries, or any other parameter that may be input by a user or application. The inputs to the synthetic tree generation module use limited memory resources and can used to develop large synthetic file trees. Using the same inputs, the synthetic tree generation module can produce the same tree or different trees using different seed values. Pseudorandom yet reproducible value sequences can be efficiently produced from each tree seed value.

In one aspect, parallel worker processing threads (also referred to as worker or workers) operate in parallel to scan the source file system and independently generate a subset of the synthetic tree. The synthetic tree generation module can assemble the various subsets of the synthetic tree to generate the synthetic tree.

In another aspect, the synthetic tree enables effective testing of algorithms, software, and hardware because it is based on metrics obtained from a real-world, source file system. Using a synthetic tree created with input parameters scanned from the source file system, the right software processes/products can be developed and proven in a laboratory setting and thereafter deployed successfully in the real world. Details of the innovative technology and various innovative workflows of the present disclosure are provided below.

System 10: FIG. 1A shows an example of a system 10 for implementing the innovative technology of the present disclosure to generate a synthetic file system tree 22, also referred to as synthetic tree 22. System 10 includes a scanner 12 that has access to a source file system 14. The source file system 14 may be an NFS (Networked File System) protocol-based file system, or any other file system type maintained by a storage system operating system (e.g., 124, FIG. 2) executed in a storage system (e.g., 120, FIG. 2) or by a cloud-based storage operating system (e.g., 140, FIG. 2). The source file system 14 keeps track of a directory structure for information (i.e., files, directories, objects and others) stored in storage devices (114, FIG. 2). The source file system 14 logically organizes stored information as a hierarchical structure. Each "on-disk" file may be implemented as a set of data blocks configured to store information, such as text, whereas a directory may be implemented as a specially formatted file in which other files and directories are stored. Data blocks that store information are organized within a volume block number (VBN) space maintained by the storage operating system. As an example, the source file system 14 uses an inode, a data structure, to store information, such as metadata, about a file, whereas data blocks are structures used to store the actual data for the file. The information in an inode may include, e.g., ownership of the file, file modification time, access permission for the file, size of the file, file type and references to locations of the data blocks for the file. The references to the locations of the file data are provided by pointers, which may further reference indirect blocks (e.g., L1 blocks) that, in turn, reference the data blocks (e.g., L0 blocks), depending upon the amount of data in the file.

Figure 1B:
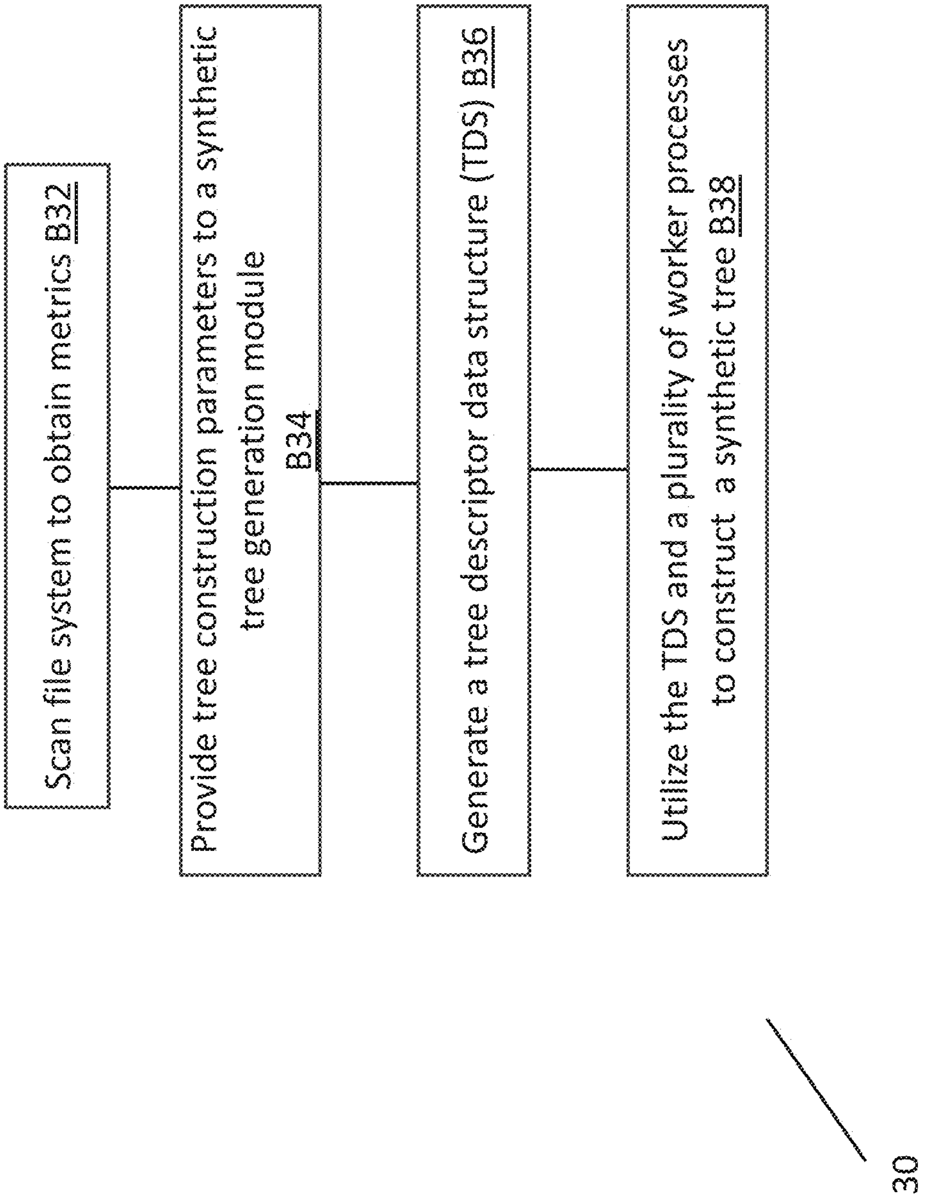
FIG. 1B shows a process flow for generating the synthetic file system tree, according to one aspect of the present disclosure.

In one aspect, scanner 12 scans the source file system 14 entries, where each entry is associated with a file, directory, symbolic link or any other type of entry. The scanner 12 starts from a root directory of the source file system 14 to the sub-directories and processes the file system entries to obtain a plurality of metrics 13. An example of metrics 13 is shown in FIG. 1E. In another aspect, scanner 12 generates a batch of entries for one or more worker processes 18A-18N (also referred to as worker process or processes 18, or worker or workers 18), and initializes each worker process 18 to process (i.e., scan) the batch of entries in parallel. The processed entries are merged by the scanner 12 to generate metrics 13. As an example, metrics 13 are stored as (label, value) pairs such as ("files", 25), ("symlinks", 4), ("subdirs", 0). The value of a metric within metrics 13 may also be a list of (label, value) pairs such as a histogram. The following example uses the JSON format to represent the number of files of each size range found in a batch of scanned entries. In this example the batch had 2 empty files of size 0, and 3 files greater than or equal to 100 megabytes, and other file sizes in various size ranges, e.g., between 1 byte and 100 megabytes.

```
"Sizes": [
    ["0-1", 2],
    ["1-8K", 46],
    ["8K-64K", 29],
    ["64K-1M", 17],
    ["1M"-10M", 4],
    ["10M-100M", 0],
    ["100M+", 3]
  ],
```

In one aspect, metrics 13 include attributes of source file system 14 entries, including file type, name, application extension (e.g., .jpg, .txt, or .zip), size, permissions, ownership, access time, modification time, depth of entry (i.e., the number of subdirectory components in a file path to the entry from the root of the tree). In addition, metrics 13 may also include the number of entries of a directory, a target status of a symbolic link, an average, maximum, and minimum values as well as histograms. Metrics 13 may also include application-specific information, e.g., number of entry names that may contain invalid Unicode encodings, or the number of entries that may have unrestricted write permissions.

In another aspect, metrics 13 may also be summarized for a subset of file system entries such as those whose sizes are greater than a chosen threshold, or those owned by the user who owns the most files, or those modified in a recent period of time such as the past month. The metrics 13 may also describe properties of file contents by reading data from some or all the non-empty files. For large file systems, with many millions of files and directories, to save time, data samples are read rather than entire files; data samples may include start of file, end of file, and random interior samples. The file content metrics also include estimates of incompressible data, data compressible to some degree, duplicated data, or zero-valued (a special case of duplicate data denoted as sparse in some file systems) data. For compressible data, metrics 13 includes an estimate of the degree of compression. In one aspect, metrics 13 includes statistical and descriptive information without duplicating any of original entry metadata, file data, or other contents of the source file system and storage.

In one aspect, scanner 12 provides metrics 13 and other parameters, jointly shown as parameters 15 to a synthetic tree generation module 24 (may also be referred to as module 24). Parameters 15 include source file system analytics i.e., metrics 13, a destination file system (i.e., the synthetic file system tree 22) location, a seed value, a total number of entries for the synthetic tree, percent of random/zero/compressible data contents for regular files, maximum number of worker processes (or default), or any other parameter. Thereafter, a tree-descriptor data structure (TDS) 28 is generated. As an example, TDS 28, includes metrics 13 or a portion thereof, a randomization seed value, and other parameters. The size of TDS 28 is the size of the input parameters to the scanner 12, and size of the metrics 13. The TDS 28 size can be controlled by a user and is insignificant by comparison to, and independent of, the size of the source and destination file system trees.

In one aspect, the synthetic tree 22 is created by one or more worker processes 18. Each worker process 18 receives an input (shown as 21A-21N and referred to as input 21 or inputs 21) from a dispatcher module 26 (also referred to as dispatcher 26) of module 24. The dispatcher 26 coordinates the workload of worker processes 18. The input 21 for each worker queue may be a portion of TDS 28 or derived from TDS 28. The input 21 may be placed at worker queues 16A-16N (may also be referred to as worker queue or worker queues 16). Each worker 18 retrieves input 21 and uses buffer 17 (shown as 17A-17N) to temporarily store the input 21, which may include a sequence of directory and/or file indices for the synthetic tree 22.

Each worker process 18 connects to a destination file system server (not shown) where the synthetic tree 22 is to be presented and issues requests to create directories and files for the synthetic tree 22. The worker process 18 also sets directory and file attributes, using the functions described below to determine the locations and attributes of each file or directory according to an index. An output 19A-19N (also referred to as output 19 or outputs 19) of each worker process is generated and merged by module 24 to produce the synthetic tree 22.

In one aspect, a parent directory of the synthetic tree 22 is first created before any files or subdirectories are created within the parent directory. In most cases, the number of directories is usually smaller vis-à-vis the number of files. In such cases, a single worker process 18 may first create the entire directory structure before any batches with files are initiated. Once all the directories are created, the files are created using other worker processes, in parallel, without requiring any coordination between worker processes 18.

For a large synthetic tree 22, e.g., with millions of directories, each directory level is created one at a time, which means first, the root directory is created, then the root directory subdirectories are created by a worker process 18 and following that next level of directories are created by another worker process. For levels having thousands or millions of directories, multiple concurrent worker processes 18 are used to create each level.

In one aspect, worker processes 18 are launched concurrently to create files whose parent directories have been created.

It is noteworthy that file systems typically do not allow duplicate names for child entries of a directory, however duplicate names may occur when independently operating worker processes 18 create directory entries using a fixed set of names. If a collision occurs due to a duplicate name, the worker process 18 creating the second, duplicate file or directory with the same name adjusts the name automatically according to a deterministic algorithm. When collisions occur due to duplicate directory names, during creation of a directory level, module 24 tracks the collisions and adjusts the directory names.

In one aspect, the following processor-executable functions are used to generate the components of the synthetic tree 22. Each function is deterministic, i.e., the same inputs produce the same outputs by module 24.

The function "Get Count(TDS)->NUM_DIRS, NUM_ENTS" determines the total number of directories and other entries for the synthetic tree 22 by using the seed value and the other parameters in TDS 28.

NUM_DIRS=the number of directories in synthetic tree 22

NUM_ENTS=the number of other entries such as regular files, symbolic links and others for the synthetic tree 22.

NUM_DIRS and/or NUM_ENTS may be based on user input or may be chosen pseudo randomly, depending on TDS 28. It is noteworthy that the same TDS 28 parameters determine the same values for NUM_DIRS, NUM_ENTS.

The function "Get_Parent_of_Entry(TDS, j)->p" determines a parent directory of a file entry of the synthetic tree 22. The input value "j" is an index of any file entry in the synthetic tree 22, enumerated from 1 to NUM_ENTS. In one aspect, Get_Parent_of_Entry(TDS, j) produces a parent index.

The function "Get_Parent_of_Dir(TDS, i)->p" determines a directory hierarchy for the synthetic tree 22. The input value "i" is an index of any directory in the synthetic tree 22, enumerated from 1 to NUM_DIRS. Get_Parent_of_Dir(TDS, i) produces a parent index p. The number of subdirectories within any parent directory may vary according to the seed value and/or other TDS 28 parameter(s). It is noteworthy that each parent directory is assigned an index value less than that of any of its subdirectories; i.e., p<i.

As a special case, the root directory index i=1, with Get_Parent_of_Dir(TDS, 1) produces p=0, indicating that the root directory has no parent directory. The deepest subdirectory and the assignment and distribution of subdirectories are determined by the using the metrics 13, the seed value, or any other generator input parameters from the TDS 28. The function "Get_Parent_of_Dir" is deterministic and ensures that p<i.

The function "Get_Attributes(TDS, k, is_dir)->[type, name, size, . . . ]" determines attributes of an entry of the synthetic tree 22. The input value "k" is an index of any entry in the synthetic tree 22. If the argument "is_dir" is True, the attributes of a directory with index=k are produced. If the argument "is_dir" is False, the attributes of a file with index=k are produced. The "Get_Attributes(TDS, k)" function produces metadata attributes for each tree entry that are also determined pseudo-randomly. The metadata attributes include file name, type, permissions (e.g., in UNIX, a 32-bit number is used to encode read/write/execute for the owner, the group members, and others), size, owner, group, or any other attribute. The function execution can be optimized by using "Get_One_Attribute(TDS, k, attribute_name)," as an additional function, which returns the same value as "Get" for a particular attribute, such as "type."

In one aspect, to make entry names human-friendly, a file with a dictionary list of words may be provided as a parameter and a word is chosen as an input to an entry naming scheme. In another aspect, synthetic tree 22 entry name lengths are chosen to approximate the statistical distribution of source name lengths. In yet another aspect, instead of using cryptographically secure pseudorandom number generators, which are processor resource usage intensive, this disclosure uses other efficient techniques, e.g., multiplicative hash using a prime near to a golden ratio that can statistically vary the generated entries and attributes in the synthetic tree 22.

Process Flows: FIG. 1B shows a process 30 for utilizing worker processes 18 in parallel to generate the synthetic tree 22, according to one aspect of the present disclosure. Process 30 begins in block B32, when the source file system 14 has been operational and has stored information at one or more storage devices. The data may be stored by an on-premise storage system (e.g., 120, FIG. 2), cloud storage 128 (FIG. 2) or both the storage system 120 and cloud storage 128. The stored information includes directories, sub-directories, application data or any other information. The scanner 12 reads the source file system directories, starting from a root directory to its sub-directories. The scanner 12 generates a batch of entries for worker processes 18. The batch of entries are processed by each worker process 18 in parallel. The processed entries are merged by the scanner 12 to generate metrics 13. As explained above, the metrics can be stored as (label, value) pairs. In one aspect, metrics 13 include attributes of all file system entries, including type, name, application extension (e.g., .jpg, .txt, or .zip), size, permissions, ownership, access time, modification time, depth of entry (i.e., the number of subdirectory components in a file path to the entry from the root of the tree). In addition, metrics 13 may also include the number of entries contained in a directory, a target status of a symbolic link, an average, maximum, and minimum values as well as histograms. Metrics 13 may also include application-specific information, e.g., several entry names that may contain invalid Unicode encodings, or how many entries may have unrestricted write permissions. An example of metrics 13 is shown in FIG. 1E.

In B34, the scanner 12 provides tree construction parameters 15 to module 24 for constructing TDS 28. Parameters 15 include source file system analytics i.e., metrics 13, destination file system (i.e., the synthetic tree 22) location, a seed value, a total number of entries for the synthetic tree, percent of random/zero/compressible data contents for regular files, maximum number of worker processes (or default), or any other parameter. Thereafter, in block B36, TDS 28 is generated. As an example, TDS 28 includes metrics 13 or a portion thereof, a randomization seed value, and other parameters. The size of TDS 28 is the size of the input parameters to the scanner 12, and the size of the metrics 13. The TDS size can be controlled by a user and is insignificant by comparison to, and independent of, the size of the source and destination file system trees.

In block B38, the synthetic tree 22 is generated using one or more worker processes 18, TDS 28 and function Get_Count(TDS)->NUM_DIRS, NUM_ENTS; function Get_Parent_of_Entry(TDS, j)->p; function Get_Parent_of_Dir (TDS, i)->; and function Get_Attributes(TDS, k, is_dir)-> [type, name, size], described above in detail.

Figure 1C:
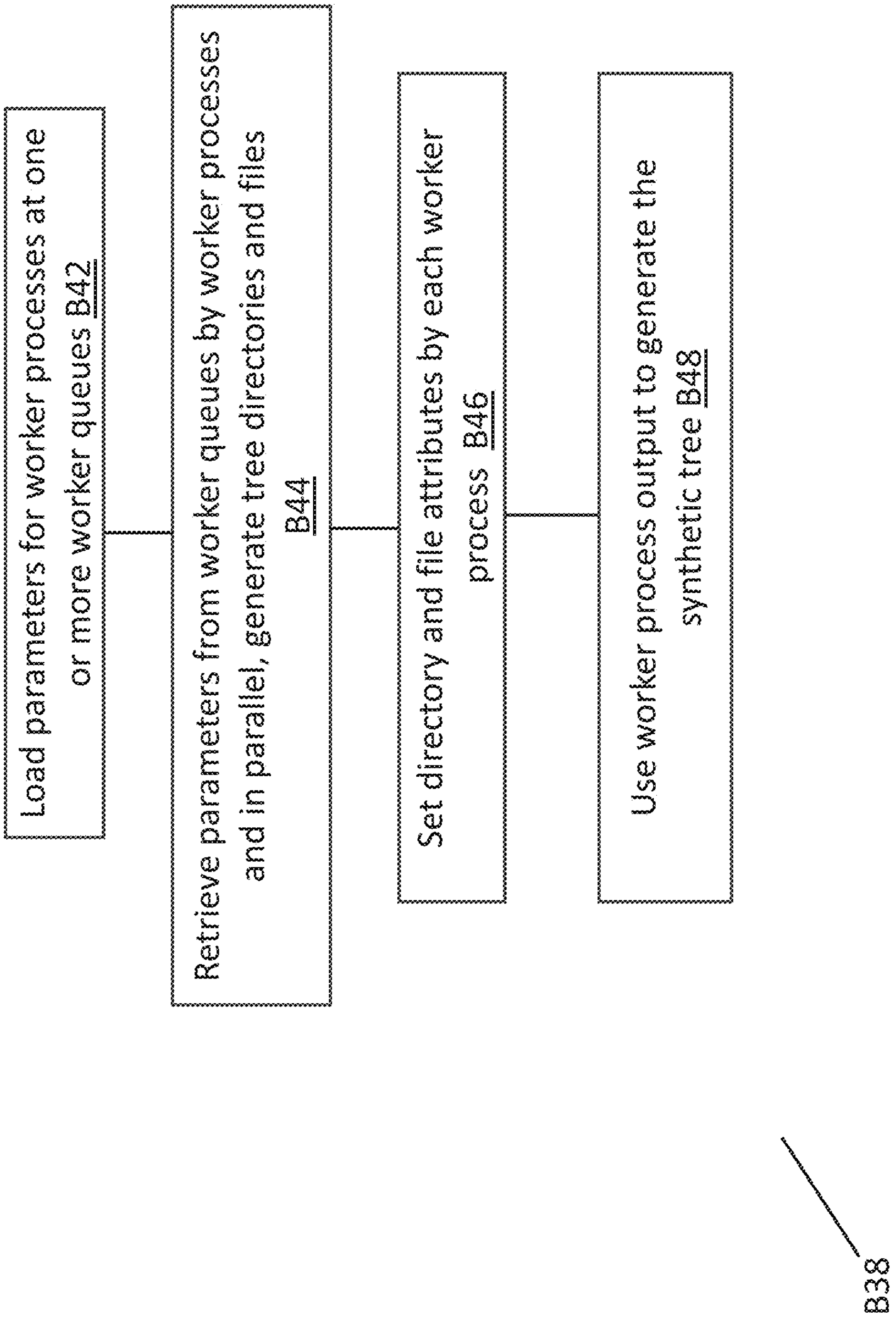
FIG. 1C shows a process flow executed by a plurality of worker processes for generating the synthetic file system tree, according to one aspect of the present disclosure.

FIG. 1C shows details of process block B38, according to one aspect of the present disclosure. Process block B38 is executed by the plurality of worker processes 18. In one aspect, in block B44, each worker process 18 accesses an assigned worker queue 16 to access input parameters 21 that are generated by module 24/dispatcher 26 and loaded at the worker queues 16 in block B42. The input parameters 21 include a sequence of directory and/or file indices as a "batch." Each worker process 18 creates directories and files, based on the input parameters 21. Each worker process 18 sets directory and file attributes, based on directory and file indices. Each worker process 18 uses the "Get Attributes" function described above to retrieve the attributes. Each worker process 18 generates an output 19A-19N, which is used in block B46 to generate the synthetic tree 22. It is noteworthy that the synthetic tree 22 may be based on merging outputs 19A-19N or based on an output 19 of a worker process.

In one aspect, a module 24 component, e.g., dispatcher 26 tracks a first worker process and a second worker process using one or more job objects. A third worker process is utilized in response to an indication that the first worker process or the second worker process is unable to generate its output (e.g., 19A or 19N, FIG. 1A).

Figure 1D:
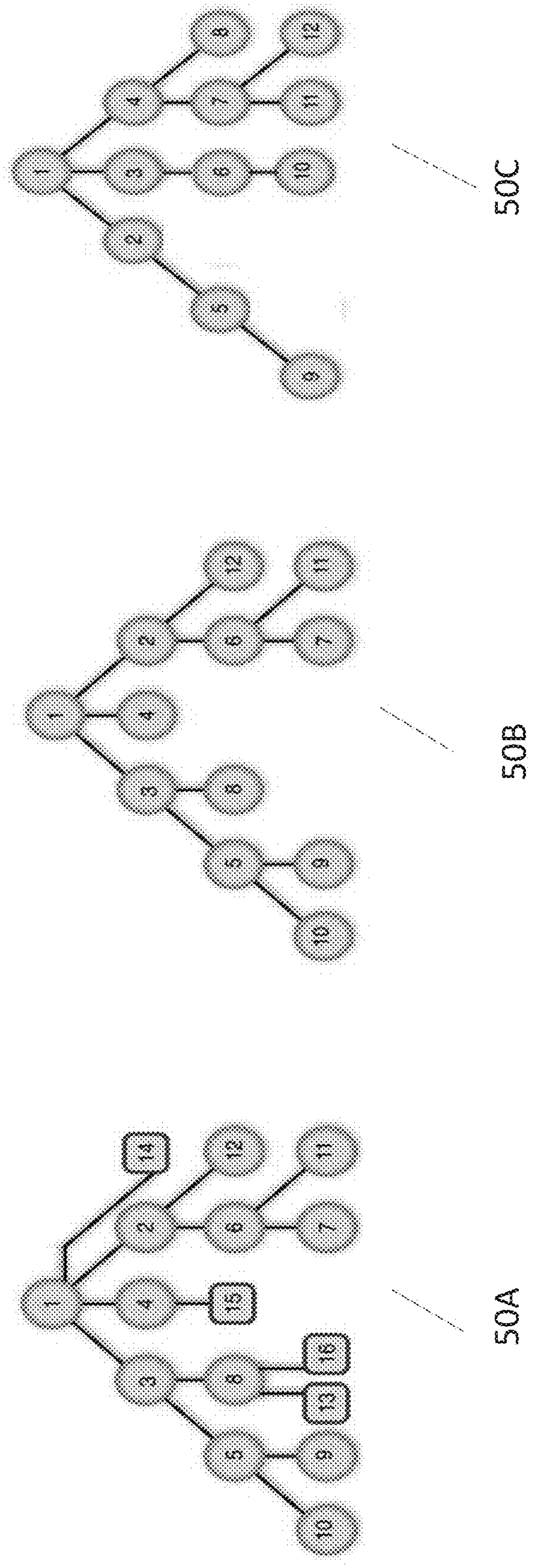
FIG. 1D shows different synthetic file system trees generated using the adaptive aspects of the present disclosure.
Figure 1E:
FIG. 1E shows an example of scanned metrics of a source file system that can be used to generate the synthetic file system tree, according to one aspect of the present disclosure.

FIG. 1D shows example of tree structures 50A-50C that can be generated using the input parameters 21. It is noteworthy that the tree structure 50A-50C can vary by changing the seed value.

In one aspect, innovative technology for methods and systems for a networked storage environment are provided. One method includes generating a plurality of metrics (13, FIG. 1A) associated with a file system (14, FIG. 1A) from a scan of the file system; defining a synthetic file tree (22, FIG. 1A) based on a tree descriptor (28, FIG. 1A), a seed value and a total number of entries for the synthetic tree, the tree descriptor based on one or more of the plurality of metrics; utilizing, by a first worker process (18A, FIG. 1A), a first portion (21A, FIG. 1A) of the tree descriptor and the seed value to generate a first subset (19A, FIG. 1A) of the synthetic file tree; and utilizing, by a second worker process (18N, FIG. 1A), a second portion (21N, FIG. 1A) of the tree descriptor and the seed value to generate a second subset (19N, FIG. 1A) of the synthetic file tree.

In another aspect, the synthetic tree 22 enables effective testing of algorithms, software, and hardware because it is based on metrics 13 and other parameters obtained from a real-world, source file system 14. Using the synthetic tree 22 created with input parameters scanned from the source file system 14, effective software processes/products can be developed and proven in a laboratory setting and deployed successfully in the real world. This is cost-effective and improves the effectiveness of software/hardware when deployed in networked storage environments.

For example, a storage system (120, FIG. 2) may use a large amount of memory for processing directories with large number of files (e.g., millions of files). Because the scanner 12 scans the source file system 14 and the synthetic trees 22 are built from the scan, it enables the storage system provider to present real file system-based data/demonstrations for potential technical solutions that can address excessive memory use.

When a storage system provider is developing a new feature for the storage system 120, it can use the synthetic tree 22 to test processor-executable algorithms that will perform well in specific customer environments. The use of the synthetic tree 22 will remove any guesswork associated with such testing.

In another example, assume that a full path name of a NAS (networked attached storage) file is 1024 characters long, and such a file cannot be simply copied to object storage because most object stores limit the "key length" to 1024. When a storage provider builds a migration tool to migrate NAS files to object storage, the synthetic tree 22 can provide useful information, e.g., customer tree depth information that can be used to build an effective migration tool.

The foregoing non-limiting examples of using the synthetic tree are simply provided to illustrate the broad application of the technology. The various adaptive aspects of the present disclosure are not limited to any specific application/example.

Figure 2:
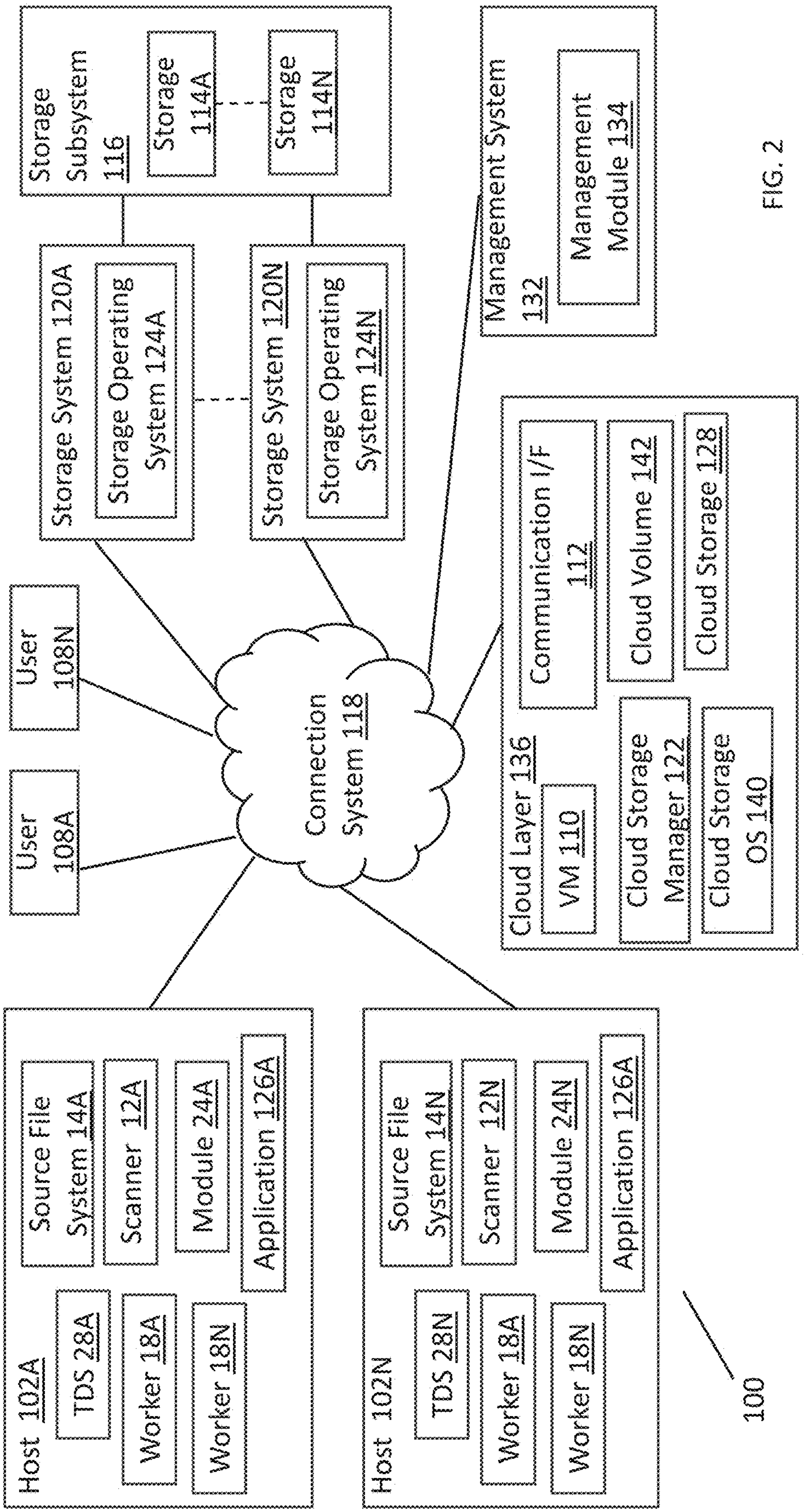
FIG. 2 shows a block diagram of an operating environment, used according to one aspect of the present disclosure.

System 100: FIG. 2 shows an example of a networked operating environment 100 (also referred to as system 100) used according to one aspect of the present disclosure. As an example, system 100 may include a plurality of storage systems 120A-120N (may also be referred to as storage server/storage servers/storage controller/storage controllers 120, and also referred to as an "on-premise" storage system 120) executing a storage operating system 124A-124N (may also be referred to as storage operating system 124 or storage operating systems 124), a plurality of computing systems 102A-102N (shown as host 102, 102A-102N and may also be referred to as a "host system 102", "host systems 102", "server 102" or "servers 102") and user systems 108A-108N (may also be referred to as "user system 108," "user systems 108," "client system 108" or "client systems 108") that may access storage space provided by a cloud layer 136 and/or a storage-subsystem 116 managed by the storage systems 120 via a connection system 118 such as a local area network (LAN), wide area network (WAN), the Internet and others. The storage-subsystem 116 includes a plurality of storage devices 114A-114N (may also be referred to as storage device/storage devices/disk/disks 114). It is noteworthy that the term "disk" as used herein is intended to mean any storage device/space and not to limit the adaptive aspects to any particular type of storage device, for example, hard disks.

In one aspect, the host systems 102 execute the scanner 12, shown as 12A-12N and module 24A-24N to generate the synthetic tree 22, described above in detail. The worker processes 18A-18N operate in parallel to scan the source file system 14A-4N and use the input parameters 21A-21N received from module 24A/24N to generate outputs 19A-19N (FIG. 1A), as described above.

In one aspect, the storage system 120 uses the storage operating system 124 to store and retrieve data from the storage sub-system 116 by accessing the storage devices 114. Data is stored and accessed using read and write requests that are also referred to as input/output (I/O) requests. The storage devices 114 may be organized as one or more RAID groups. The various aspects disclosed herein are not limited to any storage device type or storage device configuration.

In one aspect, the cloud layer 136 includes a cloud storage manager (may also be referred to as "cloud manager") 122, and a cloud storage operating system (may also be referred to as "Cloud Storage OS") 140 having access to cloud storage 128. The cloud storage manager 122 enables configuration and management of storage resources. The system and techniques described above are applicable and especially useful in the cloud computing environment where storage is presented and shared across different platforms. Cloud computing enables convenient, on-demand access to a pool of resources that may be rapidly provisioned and released with minimal management effort or service provider interaction. The term "cloud" is intended to refer to a network, for example, the Internet, and cloud computing allows shared resources, for example, software and information, to be available, on demand.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud specific services.

As an example, a cloud provider provides access to the cloud layer 136 and its components via a communication interface 112. A non-limiting example of the cloud layer 136 is a cloud platform, e.g., Amazon Web Services ("AWS") provided by Amazon Inc., Azure provided by Microsoft Corporation, Google Cloud Platform provided by Alphabet Inc. (without derogation of any trademark rights of Amazon Inc., Microsoft Corporation or Alphabet Inc.), or any other cloud platform. In one aspect, communication interface 112 includes hardware, circuitry, logic and firmware to receive and transmit information using one or more protocols. As an example, the cloud layer 136 can be configured as a virtual private cloud (VPC), a logically isolated section of a cloud infrastructure that simulates an on-premise data center with the on-premise storage system 120.

In one aspect, the cloud manager 122 is provided as a software application running on a computing device or within a virtual machine for configuring, protecting and managing storage objects. In one aspect, the cloud manager 122 enables access to a storage service (e.g., backup, restore, cloning or any other storage related service) from a "micro-service" made available from the cloud layer 136. In one aspect, the cloud manager 122 stores user information including a user identifier, a network domain for a user device, a user account identifier, or any other information to enable access to storage from the cloud layer 136.

Software applications for cloud-based systems are typically built using "containers," which may also be referred to as micro-services. Kubernetes is an open-source software platform for deploying, managing and scaling containers including the cloud storage OS 140, and the cloud manager 122. Azure is a cloud computing platform provided by Microsoft Corporation (without derogation of any third-party trademark rights) for building, testing, deploying, and managing applications and services including the cloud storage OS 140, and the cloud manager 122 using the synthetic tree 22, described above. Azure Kubernetes Service enables deployment of a production ready Kubernetes cluster in the Azure cloud for executing the cloud storage OS 140, and the cloud manager 122. It is noteworthy that the adaptive aspects of the present disclosure are not limited to any specific cloud platform.

In one aspect, the cloud storage OS 140, and the cloud manager 122 are micro-services, deployed as containers (e.g., "Docker" containers), stateless in nature, may be exposed as a REST (representational state transfer) application programming interface (API) and are discoverable by other services. Docker is a software framework for building and running micro-services using the Linux operating system kernel (without derogation of any third-party trademark rights). As an example, when implemented as Docker containers, Docker micro-service code for the cloud storage OS 140, and the cloud manager 122 is packaged as a "Docker image file". A Docker container for the cloud storage OS 140, and the cloud manager 122 is initialized using an associated image file. A Docker container is an active or running instantiation of a Docker image. Each Docker container provides isolation and resembles a lightweight virtual machine. It is noteworthy that many Docker containers can run simultaneously in a Linux-based computing system. It is noteworthy that although a single block is shown for the cloud manager 122 and the cloud storage OS 140, multiple instances of each micro-service (i.e., the cloud manager 122 and the cloud storage OS 140) can be executed at any given time to accommodate multiple user systems 108.

In one aspect, the cloud manager 122 and the cloud storage OS 140 can be deployed from an elastic container registry (ECR). As an example, ECR is provided by AWS (without derogation of any third-party trademark rights) and is a managed container registry that stores, manages, and deploys container images. The various aspects described herein are not limited to the Linux kernel or using the Docker container framework.

An example of the cloud storage OS 140 includes the "CLOUD VOLUMES ONTAP" provided by NetApp Inc., the assignee of this application (without derogation of any trademark rights). The cloud storage OS 140 is a software-defined version of a storage operating system 124 executed within the cloud layer 136 or accessible to the cloud layer 136 to provide storage and storage management options that are available via the storage system 120. The cloud storage OS 140 has access to cloud storage 128, which may include block-based, persistent storage that is local to the cloud storage OS 140 and object-based storage that may be remote to the cloud storage OS 140.

In another aspect, in addition to cloud storage OS 140, a cloud-based storage service is made available from the cloud layer 136 to present storage volumes (shown as cloud volume 142). An example of the cloud-based storage service is the "Cloud Volume Service," provided by NetApp Inc. (without derogation of any trademark rights). The term volume or cloud volume (used interchangeably throughout this specification) means a logical object, also referred to as a storage object, configured to store data files (or data containers or data objects), scripts, word processing documents, executable programs, and any other type of structured or unstructured data. From the perspective of a user system 108, each cloud volume can appear to be a single storage drive. However, each cloud volume can represent the storage space in one storage device, an aggregate of some or all the storage space in multiple storage devices, a RAID group, or any other suitable set of storage space. The various aspects of the present disclosure may include both the cloud storage OS 140 and the cloud volume service or either one of them.

As an example, user systems 108 are computing devices that can access storage space at the storage system 120 via the connection system 118 or from the cloud layer 136 presented by the cloud provider 104 or any other entity. The user systems 108 can also access computing resources, as a virtual machine ("VM") (e.g., compute VM 110) via the cloud layer 136. A user may be the entire system of a company, a department, a project unit or any other entity. Each user system is uniquely identified and optionally, may be a part of a logical structure called a storage tenant (not shown). The storage tenant represents a set of users (may also be referred to as storage consumers) for the cloud provider 104 that provides access to cloud-based storage and/or compute resources (e.g., 110) via the cloud layer 136 and/or storage managed by the storage system 120.

In one aspect, host systems 102 are configured to also execute a plurality of processor-executable applications 126A-126N (may also be referred to as "application 126" or "applications 126"), for example, a database application, an email server, and others. These applications may be executed in different operating environments, for example, a virtual machine environment, Windows, Solaris, Unix (without derogation of any third-party rights) and others. The applications 126 use storage system 120 or cloud storage 128 to store information at storage devices. Although hosts 102 are shown as stand-alone computing devices, they may be made available from the cloud layer 136 as compute nodes executing applications 126 within VMs (shown as compute VM 110).

Each host system 102 interfaces with a management module 134 of a management system 132 for managing backups, restore, cloning and other operations for the storage system 120. The management module 134 is used for managing and configuring various elements of system 100. Management system 132 may include one or more computing systems for managing and configuring the various elements. Although the management system 132 with the management module 134 is shown as a stand-alone module, it may be implemented with other applications, for example, within a virtual machine environment. Furthermore, the management system 132 and the management module 134 may also be referred to interchangeably throughout this specification.

In one aspect, the storage system 120 provides a set of storage volumes directly to host systems 102 via the connection system 118. In another aspect, the storage volumes are presented by the cloud storage OS 140, and in that context a storage volume is referred to as a cloud volume (e.g., 142). The storage operating system 124/cloud storage OS 140 present or export data stored at storage devices 114/cloud storage 128 as a volume (or a logical unit number (LUN) for storage area network ("SAN") based storage).

The storage operating system 124/cloud storage OS 140 are used to store and manage information at storage devices 114/cloud storage 128 based on a request generated by application 126, user 108 or any other entity. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols for SAN storage, for example, the Small Computer Systems Interface (SCSI) protocol encapsulated over TCP (iSCSI) and SCSI encapsulated over Fibre Channel (FC), object-based protocol or any other protocol.

In a typical mode of operation, one or more input/output (I/O) requests are sent over connection system 118 to the storage system 120 or the cloud storage OS 140, based on the request. Storage system 120/cloud storage OS 140 receives the I/O requests, issues one or more I/O commands to storage devices 114/cloud storage 128 to read or write data on behalf of the host system 102 and issues a response containing the requested data over the network 118 to the respective host system 102.

Although storage system 120 is shown as a stand-alone system, i.e., a non-cluster-based system, in another aspect, storage system 120 may have a distributed architecture; for example, a cluster-based system that may include a separate network module and storage module. Briefly, the network module is used to communicate with host systems 102, while the storage module is used to communicate with the storage devices 114.

Alternatively, storage system 120 may have an integrated architecture, where the network and data components are included within a single chassis. The storage system 120 further may be coupled through a switching fabric to other similar storage systems (not shown) which have their own local storage subsystems. In this way, all the storage subsystems can form a single storage pool, to which any client of any of the storage servers has access.

In one aspect, the storage system 120 (or the cloud storage OS 140) can be organized into any suitable number of virtual servers (may also be referred to as "VServers" or virtual storage machines), in which each VServer represents a single storage system namespace with separate network access. Each VServer has a specific client domain and a security domain that are separate from the client and security domains of other VServers. Moreover, each VServer can span one or more physical nodes, each of which can hold storage associated with one or more VServers. User systems 108/host 102 can access the data on a VServer from any node of the clustered system, through the virtual interface associated with that VServer. It is noteworthy that the aspects described herein are not limited to the use of VServers.

As an example, one or more of the host systems (for example, 102A-102N) or a compute resource (not shown) of the cloud layer 136 may execute a VM environment where a physical resource is time-shared among a plurality of independently operating processor executable VMs (including compute VM 110). Each VM may function as a self-contained platform, running its own operating system (OS) and computer executable, application software. The computer executable instructions running in a VM may also be collectively referred to herein as "guest software." In addition, resources available within the VM may also be referred to herein as "guest resources."

The guest software expects to operate as if it were running on a dedicated computer rather than in a VM. That is, the guest software expects to control various events and have access to hardware resources on a physical computing system (may also be referred to as a host system) which may also be referred to herein as "host hardware resources". The host hardware resource may include one or more processors, resources resident on the processors (e.g., control registers, caches, and others), memory (instructions residing in memory, e.g., descriptor tables), and other resources (e.g., input/output devices, host attached storage, network attached storage or other like storage) that reside in a physical machine or are coupled to the host system.

Figure 3:
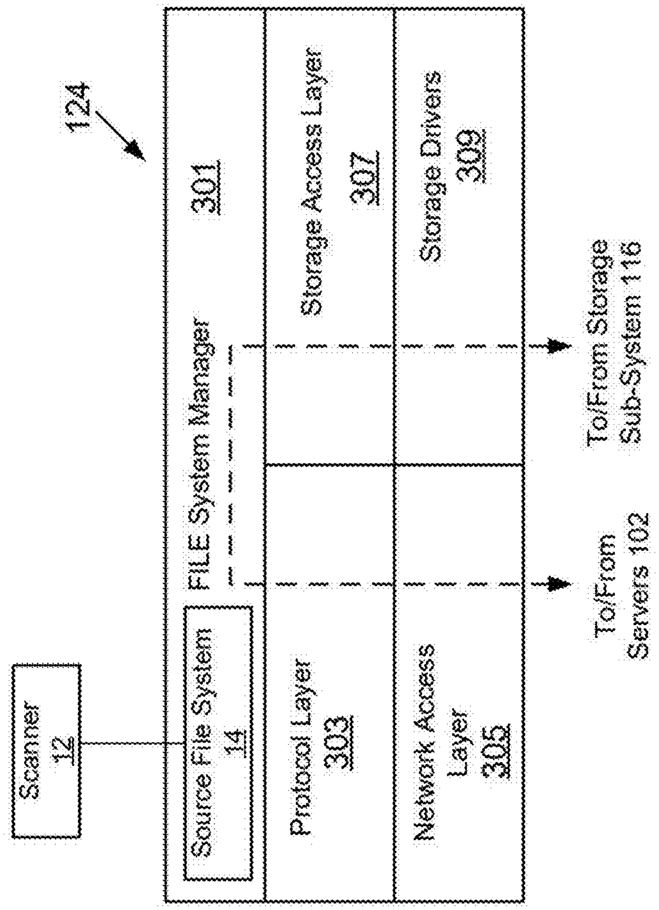
FIG. 3 shows an example of a storage operating system, used according to one aspect of the present disclosure.

Storage Operating System: FIG. 3 illustrates a generic example of the storage operating system 124 (or cloud storage OS 140) executed by the storage system 120, according to one aspect of the present disclosure. As an example, operating system 124 may include several modules, or "layers". These layers include a file system manager 301 that keeps track of a directory structure (hierarchy) of the data stored in storage devices and manages read/write operations, i.e., executes read/write operations on storage devices in response to host system 102 requests. In one aspect, the source file system 14 is managed by the file system manager 301 and accessible to scanner 12, as described above in detail.

The storage operating system 124 may also include a protocol layer 303 and an associated network access layer 305, to allow storage system 120 to communicate over a network with other systems, such as host system 102, and management system 132. Protocol layer 303 may implement one or more of various higher-level network protocols, such as NFS, CIFS, S3, Hypertext Transfer Protocol (HTTP), TCP/IP and others.

Network access layer 305 may include one or more drivers, which implement one or more lower-level protocols to communicate over the network, such as Ethernet. Interactions between host systems 102 and the storage subsystem 116 are illustrated schematically as a path, which illustrates the flow of data through storage operating system 124.

The storage operating system 124 may also include a storage access layer 307 and an associated storage driver layer 309 to communicate with a storage device 114. The storage access layer 307 may implement a higher-level disk storage protocol, such as RAID layer while the storage driver layer 309 may implement a lower-level storage device access protocol, such as the NVMe (Non-volatile Memory) protocol.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 120.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly attached to a client or host computer. The term "storage system" should therefore be taken broadly to include such arrangements in addition to any subsystems configured to perform a storage function and associated with other equipment or systems.

Figure 4:
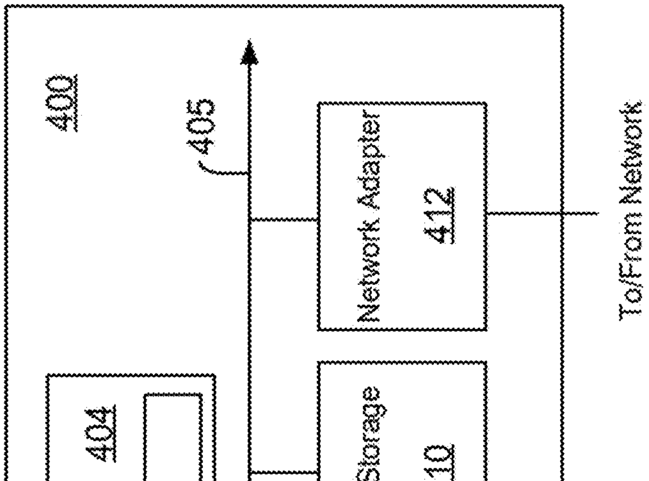
FIG. 4 shows an example of a processing system, used according to one aspect of the present disclosure.

Processing System: FIG. 4 is a high-level block diagram showing an example of the architecture of a processing system, at a high level, in which executable instructions as described above can be implemented. The processing system 400 can represent the storage system 120, the management system 132, host systems 102, and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random-access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code for executing the process blocks of FIGS. 1B-1C, TDS 28 and the various functions for generating the synthetic tree 22.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Thus, methods and apparatus for generating a synthetic tree have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method executed by one or more processors, comprising:

generating a plurality of metrics associated with a file system from a scan of the file system;

defining a synthetic file tree based on a tree descriptor, a randomization seed value and a total number of entries for the synthetic tree, the tree descriptor based on one or more of the plurality of metrics;

utilizing, by a first worker process, a first portion of the tree descriptor based on the one or more of the plurality of metrics and the randomization seed value to generate a first subset of the synthetic file tree, wherein the first subset includes directories and files of the synthetic file tree; and utilizing, by a second worker process, a second portion of the tree descriptor based on the one or more of the plurality of metrics and the randomization seed value to generate a second subset of the synthetic file tree, wherein the second subset includes other directories and other files of the synthetic file tree, wherein the randomization seed value is used to produce at least one pseudorandom value sequence;

wherein a directory hierarchy of the synthetic file tree is determined using the randomization seed value and the tree descriptor such that a number of directories, a number of entries and parent-child directory relationships of the synthetic file tree vary based on the randomization seed value, and wherein the synthetic file tree is generated without duplicating a directory structure, metadata and contents of the file system.

2. The method of claim 1, further comprising:

generating the synthetic tree by combining the first and second subset.

3. The method of claim 1, wherein the plurality of metrics is based on metadata associated with files and directories of the file system.

4. The method of claim 1, wherein the plurality of metrics includes one or more of file size, file modification time, file access time, and a number of files of the file system.

5. The method of claim 1, further comprising:

concurrently generating the files, the other files, the directories and the other directories by the first and second worker processes for the first subset and the second subset.

6. The method of claim 1, further comprising tracking the first worker process and the second worker process using one or more job objects.

7. The method of claim 6, further comprising:

utilizing a third worker process in response to an indication that the first worker process or the second worker process is unable to generate the first subset or the second subset.

8. A non-transitory machine-readable medium having stored thereon instructions for performing a method comprising machine executable code which when executed by at least one machine, causes the machine to:

generate a plurality of metrics associated with a file system from a scan of the file system;

define a synthetic file tree based on a tree descriptor, a randomization seed value and a total number of entries for the synthetic tree, the tree descriptor based on one or more of the plurality of metrics;

utilize, by a first worker process, a first portion of the tree descriptor based on the one or more of the plurality of metrics and the randomization seed value to generate a first subset of the synthetic file tree; and utilize, by a second worker process, a second portion of the tree descriptor based on the one or more of the plurality of metrics and the randomization seed value to generate a second subset of the synthetic file tree, wherein the randomization seed value is used to produce at least one pseudorandom value sequence;

wherein a directory hierarchy of the synthetic file tree is determined using the randomization seed value and the tree descriptor such that a number of directories, a number of entries and parent-child directory relationships of the synthetic file tree vary based on the randomization seed value, and wherein the synthetic file tree is generated without duplicating a directory structure, metadata and contents of the file system.

9. The non-transitory machine-readable medium of claim 8, wherein the machine executable code further causes the at least one machine to:

generate the synthetic tree by combining the first and the second subset.

10. The non-transitory machine-readable medium of claim 8, wherein the plurality of metrics is based on metadata associated with files and directories of the file system.

11. The non-transitory machine-readable medium of claim 8, wherein the plurality of metrics includes one or more of file size, file modification time, file access time, and a number of files of the file system.

12. The non-transitory machine-readable medium of claim 8, wherein the machine executable code further causes the at least one machine to:

concurrently generate files and directories by the first and second worker processes for the first subset and the second subset.

13. The non-transitory machine-readable medium of claim 8, wherein the machine executable code further causes the at least one machine to:

track the first worker process and the second worker process using one or more job objects.

14. The non-transitory machine-readable medium of claim 8, wherein the machine executable code further causes the at least one machine to:

utilize a third worker process in response to an indication that the first worker process or the second worker process is unable to generate the first or the second subset.

15. A system, comprising:

a memory containing machine readable medium comprising machine executable code having stored thereon instructions; and a processor coupled to the memory; the processor configured to execute the machine executable code to cause the processor to:

generate a plurality of metrics associated with a file system from a scan of the file system;

define a synthetic file tree based on a tree descriptor, a randomization seed value and a total number of entries for the synthetic tree, the tree descriptor based on one or more of the plurality of metrics;

utilize, by a first worker process, a first portion of the tree descriptor based on the one or more of the plurality of metrics and the randomization seed value to generate a first subset of the synthetic file tree; and utilize, by a second worker process, a second portion of the tree descriptor based on the one or more of the plurality of metrics and the randomization seed value to generate a second subset of the synthetic file tree, wherein the randomization seed value is used to produce at least one pseudorandom value sequence;

wherein a directory hierarchy of the synthetic file tree is determined using the randomization seed value and the tree descriptor such that a number of directories, a number of entries and parent-child directory relationships of the synthetic file tree vary based on the randomization seed value, and wherein the synthetic file tree is generated without duplicating a directory structure, metadata and contents of the file system.

16. The system of claim 15, wherein the machine executable code further causes the processor to:

generate the synthetic tree by combining the first and the second subset.

17. The system of claim 15, wherein the plurality of metrics is based on metadata associated with files and directories of the file system.

18. The system of claim 15, wherein the plurality of metrics includes one or more of file size, file modification time, file access time, and a number of files of the file system.

19. The system of claim 15, wherein the machine executable code further causes the processor to:

concurrently generate files and directories by the first and second worker processes for the first and second subset.

20. The system of claim 15, wherein the machine executable code further causes the processor to:

track the first worker process and the second worker process using one or more job objects; and utilize a third worker process in response to an indication that the first worker process or the second worker process is unable to generate the first or the second subset.

* * * * *